UNITED STATES PATENT OFFICE.

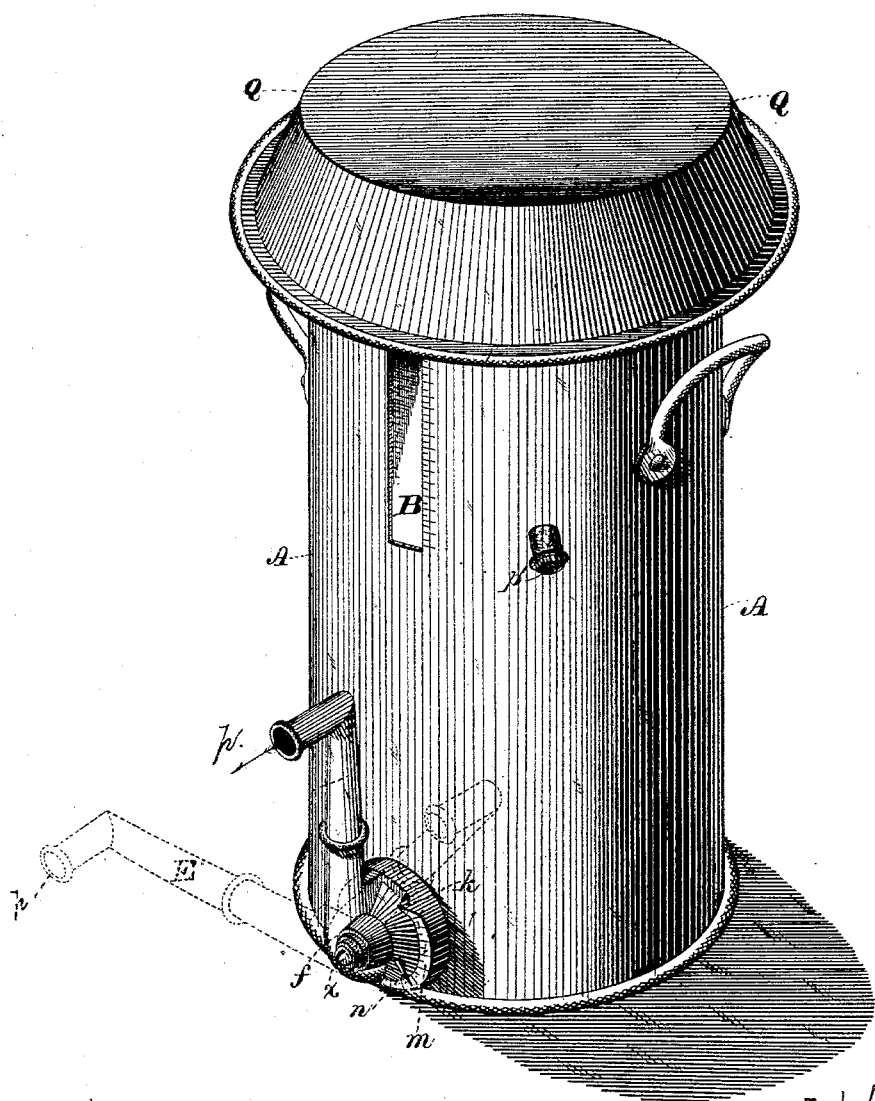

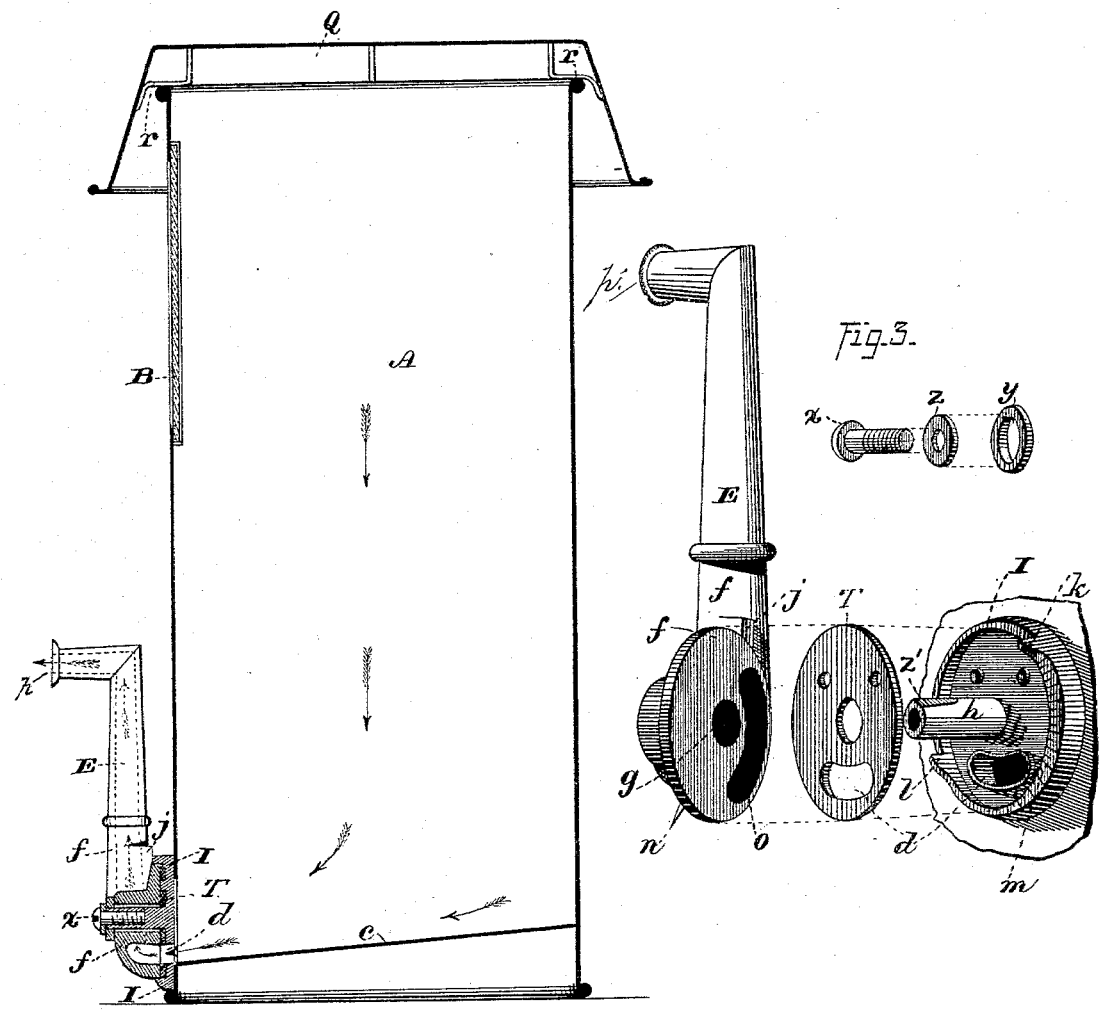

FRANCIS G. BUTLER, OF BELLOWS FALLS, VERMONT, ASSIGNOR TO VERMONT FARM MACHINE COMPANY, OF SAME PLACE.

CREAMING-CAN.

SPECIFICATION forming part of Letters Patent No. 321,340, dated June 30, 1885.

Application filed November 20, 1878.

*To all whom it may concern:*

Be it known that I, FRANCIS G. BUTLER, of Bellows Falls, in the county of Windham and State of Vermont, have invented certain new and useful Improvements in Creaming-Cans; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention consists in a milk-vessel having an adjustable faucet that can be set to automatically discharge any predetermined quantity of milk to leave in the vessel a certain quantity of cream, and provided with a glass pane to ascertain the degree or place of adjustment of the faucet; in a milk-setting vessel adapted for raising cream by sealing in water, having an overhanging cover and internal supports for raising the cover slightly above the vessel, as hereinafter more particularly set forth, and in certain details of construction, which will fully appear from the following description.

Figure 1 is a perspective view of a milk-vessel with my improvements thereon ready for use; Fig. 2, a vertical section of the same; and Fig. 3 represents, in perspective, the several parts in detail which compose the valve and its discharging-tube.

A represents any ordinary can, or it may be a pail or other vessel, for holding milk, and near its top it is provided with a pane or panel, B, of glass or other translucent material, of sufficient length vertically to show an observer the height of the cream which may be raised upon the milk in the vessel.

A scale in inches and divisions of inches may, if desired, be marked upon the can, vessel, or glass, as shown in Fig. 1, to indicate the height of the raised cream. The glass may be used, however, without any scale.

The object of indicating the height or quantity of cream before it is drawn off has relation to the method and means, next to be described, for afterward drawing it off from the bottom of the vessel or from above the milk; and in this respect it differs from the object and function of the pane described in my Patent No. 194,510, which could only show the height of the cream after all the milk had been drawn off from beneath it. The bottom of the vessel is preferably made slanting or inclining toward its outlet-orifice, as shown at $c$ in Fig. 2, this orifice $d$ being at the lowest part of the bottom, so as to effect a full discharge of the contents.

E is a discharging tube or faucet, connected to or made continuous with the valve-piece $f$, the latter by means of its center hole, $g$, being adapted to turn on a center pin or arbor, $h$, fixed on the vessel or on a cap piece or plate, I, as shown. The valve and its tube are vibratory on the arbor, and the valve-piece has a projection or stop, $j$, and the plate I or the vessel has stops $k$ $l$ to limit or arrest the vibratory or swinging movements in either direction when the stop $j$ comes in contact either with $k$ or $l$, respectively. The piece I has a graduated scale, $m$, and the valve-piece $f$ carries a pointer or index, $n$. The inlet-opening $o$ of the valve-piece $f$ is longer than its breadth, and made in the arc of a circle, of which the arbor is the center, and its position and its length are such relatively to the stationary orifice $d$ that when the valve-tube E is out of operative position for discharging, or upright, the valve-inlet $o$ is closed, but in any position adapted for discharging the communication of $o$ with $d$ will be more or less open, according to the position of the swinging tuble. The valve-piece $f$ and its tube are affixed and held to place by means of the screw $x$ and appropriate washers, $y$ $z$, and the arbor is preferably a little flattened at one side, as shown at $z'$, to prevent the washer $y$, which has a correspondingly-shaped opening, from turning when the tube is turned upon its axis.

T is a leather or flexible packing-piece interposed between the plate I and the valve-piece $f$.

The operation is as follows: The vessel having been supplied with milk, and the cream having been raised thereon, say, to the depth of four inches, as indicated by or through the glass, the discharge tube or pipe E is then turned or swung upon its center or arbor $h$ so as to adjust its discharging-mouth $p$ at the same height of four inches above the average bottom line or level of the vessel. This movement also opens the valve, and the can or vessel will now automatically discharge all the milk which is below the cream and leave the cream in the vessel, say, four inches in depth. A further turning down on its arbor of the pipe (which should be held tight enough by its center screw to maintain any position to which it may be set) will permit the subsequent discharge of any desired portion or all of the cream, and this should be discharged into another receptacle. The slanting bottom not only lets the contents out easier, but makes a better separation of the milk from the cream than if the bottom were level.

By the aid of the translucent pane B in the upper part of the vessel the cream may, when desired, be drawn off from above the milk through a non-adjustable or fixed outlet or faucet $p'$, such outlet being located at some convenient point in the side of the vessel below the lowermost line of the cream; but this feature I do not claim as my invention. In such case I let off from the bottom of the vessel, by any convenient outlet, enough of the milk to lower the cream down to the fixed outlet above named, the glass indicating when this is done. I then open the upper faucet or outlet, $p'$, and draw off the cream from the surface of the milk, and next discharge from the bottom of the vessel the remainder of the milk.

Q is a flaring and elevated cover for the milk vessel, its top being elevated somewhat above the top edge of the vessel by means of supports or rests $r\ r$ inside the cover. These supports may be simply bent wires affixed to the cover, or they might be projections on the top of the can itself. This acts as a deodorizer for carrying off the taint or odor of vegetables which may have been fed to the cows, and when the whole is water-sealed by immersing the vessel and its secured cover under water this raised cover allows the gases and animal heat to pass freely from the milk into the water, while at the same time sealing the milk from the outer atmosphere. With this raised cover I find I can work the creamer with about 5° higher temperature than without it, and can raise cream in less time, because the cooling effect of the water is more directly upon the milk.

I do not in this application claim my improved method or process of separating cream from milk, as I have claimed that in another application, filed November 8, 1881, the present application being for mechanism or devices as distinguished from the process.

Water-sealing covers have been used before, but raised covers, which are also water-sealing, have not, so far as I am aware, ever been used.

What I claim, and desire to secure by Letters Patent, is—

1. A milk-vessel having an adjustable faucet that can be set to automatically discharge any predetermined quantity of milk to leave in the vessel a certain quantity of cream, and provided with a glass pane to ascertain the degree or place of adjustment of the faucet.

2. A milk-setting vessel adapted for raising cream by sealing in water, having an overhanging cover and internal supports for raising the cover slightly above the vessel, as and for the purposes set forth.

3. The combination, with a milk-vessel having a translucent pane and an inclined bottom, of an adjustable discharging-faucet communicating with the vessel at the lower part of the incline, and arranged to be set to automatically discharge a predetermined quantity of the contents of the vessel.

4. The combination, with a milk-setting vessel adapted for raising cream and having a translucent pane, of an adjustable faucet opening into the bottom of the vessel and arranged to be turned on a center and in a vertical plane, and provided with the stop $j$ and pointer $n$ thereon, and the plate I, having stops $k$ and $l$, and a scale $m$, substantially as shown and described.

5. A milk-setting vessel adapted for raising cream by sealing in water, having an overhanging cover, and supports for raising the cover slightly above the vessel, as and for the purposes set forth.

6. The combination of a milk-can having a glass panel in its side to show the thickness of the cream and an inclined bottom with a discharging-cock applied directly to the side of the can, and a pipe applied to the cock, whereby the pipe can be so adjusted as to draw off the milk and leave the cream behind, substantially as shown and described.

7. A milk-setting vessel adapted for raising cream by standing in water, and having supports for a raised cover provided with a cover adapted to be held raised above the vessel by means of such supports, but with its lower edge below the top of the vessel.

8. A milk-setting vessel adapted for raising cream by standing in water, and having supports for a raised cover provided with a cover adapted to be held raised above the vessel by means of such supports, but with its lower edge below the top of the vessel and to dip into the water surrounding the vessel.

FRANCIS G. BUTLER.

Witnesses:
H. L. GALE,
J. H. WILLIAMS.